Nov. 22, 1966 G. H. PERRY ET AL 3,287,707

MAGNETIC STORAGE DEVICES

Filed May 26, 1959 6 Sheets-Sheet 1

Gerald H. Perry
Sydney J. Widdows
*Inventors*

By Cushman, Darby & Cushman
*Attorneys*

Gerald H. Perry
Sydney J. Widdows
Inventors
By Cushman, Darby & Cushman
Attorneys Gerald H. Perry
Sydney J. Widdows
Inventors
By Cushman, Darby & Cushman
Attorneys

MAGNETIC STORAGE DEVICES

Filed May 26, 1959

Gerald H. Perry
Sydney J. Widdows
*Inventors*
By Cushman, Darby & Cushman
*Attorneys*

Gerald H. Perry
Sydney J. Widdows
Inventors
By Cushman, Darby & Cushman
Attorneys 3,287,707

MAGNETIC STORAGE DEVICES

Gerald Horace Perry and Sydney John Widdows, Malvern, England, assignors, by mesne assignments, to International Business Machines Corporation, New York, N.Y., a corporation of New York Filed May 26, 1959, Ser. No. 815,909
Claims priority, application Great Britain, May 27, 1958, 16,924/58; Oct. 10, 1958, 32,382/58; Mar. 2, 1959, 7,131/59
7 Claims. (Cl. 340—174)

Figures 1, 2:
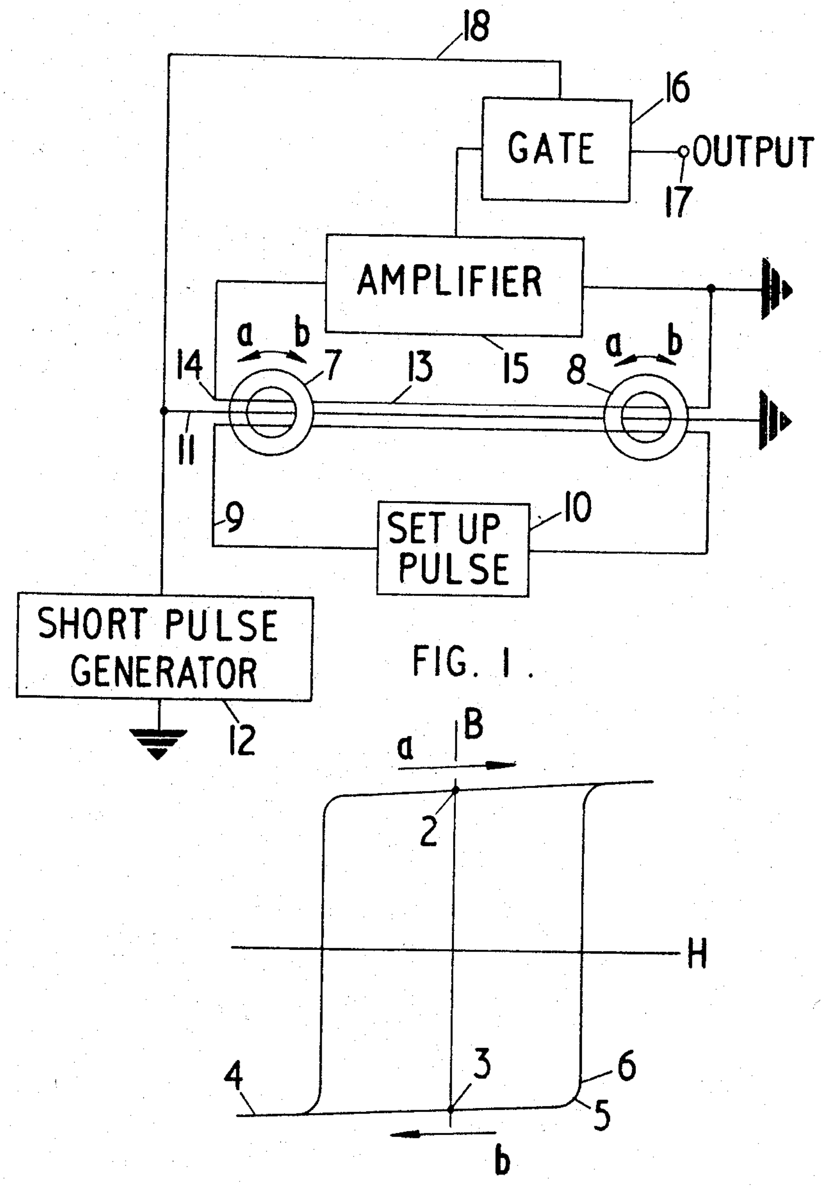

This invention relates to magnetic storage devices and has reference to devices which make use of magnetic circuits of the so-called rectangular hysteresis loop type.

In these storage devices a suitable closed circuit for magnetic flux is provided by means of magnetic material, generally that having a rectangular hysteresis loop, a typical example being a ring or other closed loop of a suitable ferrite material. The storage property of a device is obtained owing to the two well-defined states of magnetisation of the magnetic circuit. If the ring is magnetised by being subjected to a magnetic field above a critical value in one direction the resulting remanent flux will be in a corresponding direction around the ring; if the ring is then magnetised in the opposite direction the resulting flux will be in the opposite direction to the flux previously set up. Thus, information can be very conveniently stored in binary form.

The possibility of obtaining two distinct magnetic states when magnetic material of the rectangular hysteresis loop type is used and of driving the material of the core from one state to the other appears directly from the shape of the hysteresis loop of the material—although called rectangular, the hysteresis loop would, more accurately, resemble a parallelogram about the origin of the B–H curve having sides which are slightly inclined to B and H axes. The two magnetic storage states can be maintained without requiring periodical maintenance or renewal of the state by an external agency.

More generally the magnetisations corresponding to the two different magnetic states need not necessarily be the equal and oppositely-directed magnetisations corresponding to the uppermost and lowermost remanence states of the rectangular hysteresis loop. Two distinct magnetic states are possible if different, spaced values of remanence for magnetisation in the same direction are considered. In these circumstances in effect a smaller, perhaps less clearly defined, hysteresis loop of the rectangular type is made use of and its use is determined by the magnitude of the currents in any setting-up circuit used for setting-up desired magnetisation states in the magnetic circuit.

A difficulty arises, however, in that the state of the core, which must be made known from time-to-time if the information stored is to be usefully available, cannot be determined without changing its state. The common way of determining the state of a core is to interrogate it by applying a magnetising force sufficient to change the state of the core from one given state to another; if the state of the core does change it can be deduced from the nature of the change what state the core was in before interrogation; if the state does not change it is deduced that the core was not in the given state but in the opposite state before the interrogation.

Efforts have been made to overcome these difficulties by providing auxiliary circuits which automatically restore the core after a change of state so as to return it to its original correct storage state or, alternatively, which remember that the state of the core has been changed incidentally during an interrogation. Expedients of this kind, it will be appreciated, are complicated and not entirely satisfactory ways of getting over the difficulty and it is an object of the present invention to provide a storage device which can be interrogated without changing the information stored.

V. L. Newhouse has shown in his paper, The Utilization of Domain Wall Viscosity in Data Handling Devices, Proc. I.R.E., November 1957, that rectangular hysteresis loop magnetic tape can exhibit the property of elasticity of motion of its domain walls: this property can be called magnetic inertia and the present invention makes use of such properties discovered in ferrite rectangular hysteresis loop material.

We have experimented with a core of a ferrite rectangular hysteresis loop material and have found that if the core, in a given state of magnetisation is subjected to a magnetising force in the form of a short duration pulse so that it tends to become less saturated and its operating point on the B–H curve moves along the appropriate saturation line and then slightly beyond the knee on the way to the opposite state of magnetisation, the state of the core does not change if the pulse duration is short enough but remains in its original state, the operating point tracing its way back along the original saturation line when the pulse ceases. As a result of applying a magnetising force to a core in this way an induced signal appears in a suitable output winding coupling with the core.

On the other hand if the core is subjected to a short duration magnetising pulse so that it tends to become more saturated in a given state, its operating point merely moves along the appropriate saturation line towards a higher saturation level, recovering when the pulse ceases. Again an induced signal appears in an output winding on the core of the same polarity, but not so large, as before.

Briefly then provided different states of magnetisation, i.e. different remanences of a magnetic circuit of the rectangular hysteresis loop type are suitably chosen a short energising pulse applied to the circuit causes it to execute a limited there-and-back excursion along a part of a rectangular type hysteresis loop dependent upon its state at the time; and the response of the circuit to the short pulse is different for the different states.

The pulse duration employed—a typical value of a current pulse in an energising winding coupled to the core is 100 millimicroseconds (mμsec)—is short and the waveforms which appear in the output winding are complicated, consequently it is difficult to distinguish between the two different induced signals in circuits of the kind with which a core would be used to provide a magnetic storage device; although by recurrent interrogation of a core by a succession of pulses and displaying the output winding signals on a high-speed oscillograph the waveforms of the two induced signals can be photographed and distinction made between them.

According to the invention therefore a magnetic storage device comprises a pair of magnetic circuits each having a rectangular hysteresis loop characteristic and consequently capable of being set up into two different predeterminable magnetisation states, a setting-up circuit coupled to both magnetic circuits so that their states are determined by input signals applied to the setting-up circuit and information is stored according to the resulting arrangement of their states, an interrogating circuit for interrogating both magnetic circuits which applies to each a short-duration magnetising pulse so that each of the two magnetic circuits undertakes one of two possible excursions according to its state at the time, (*i*) it is driven further into saturation and returns at the conclusion of the pulse, (*ii*) it is driven away from saturation to an extent which permits it to return at the conclusion of the pulse, and an output circuit coupled to each magnetic circuit for providing an output signal representing the algebraic sum of the signals induced when the interrogating circuit interrogates the magnetic circuits, whereby the output signal is polarised in one sense when the arrangement of the states of the magnetic circuits is such that excursion (*ii*) takes place in one magnetic circuit and excursion (*i*) takes place in the other magnetic circuit, and in the opposite sense when the arrangement of the states of the magnetic circuits is such that excursion (*i*) takes place in the one magnetic circuit and excursion (*ii*) takes place in the other magnetic circuit.

In order to make the invention clearer examples of magnetic storage devices according to the invention will now be described with reference to the accompanying drawings.

Figure 3:
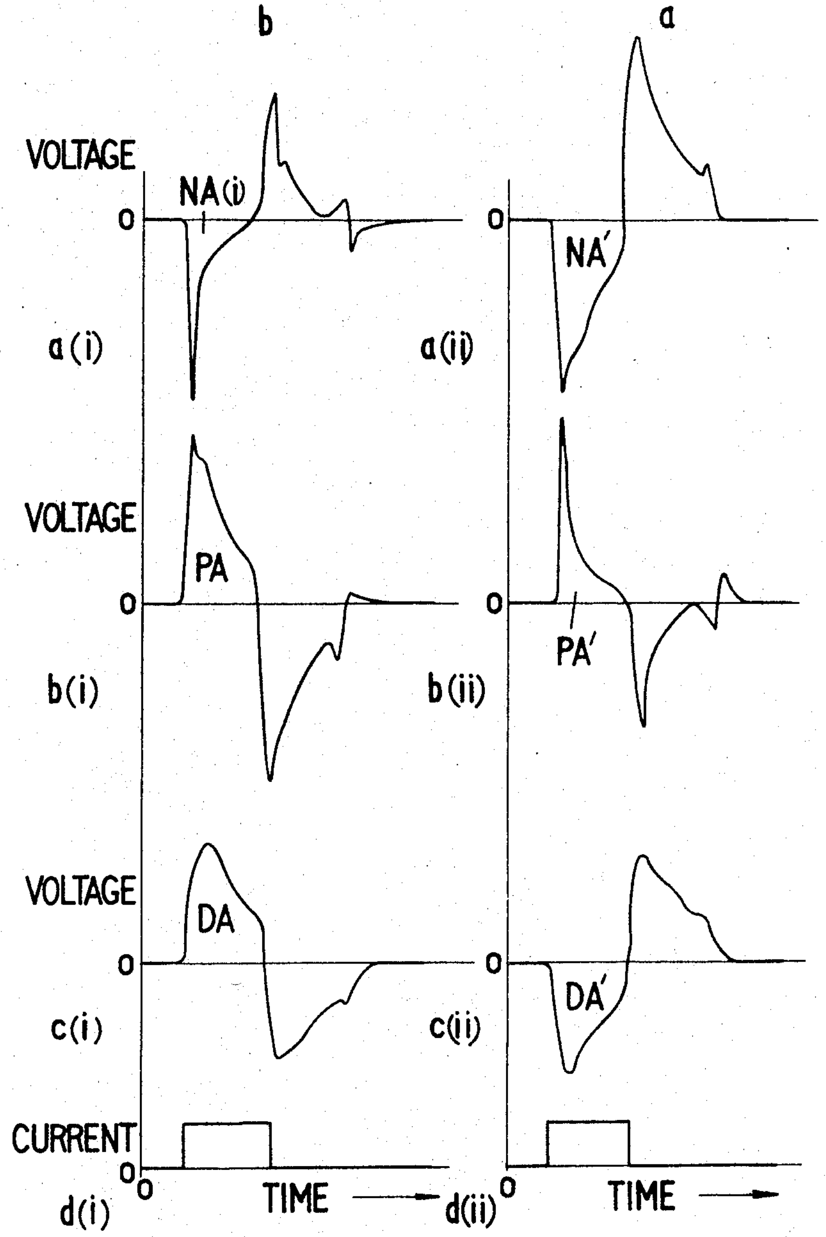
Figure 4:
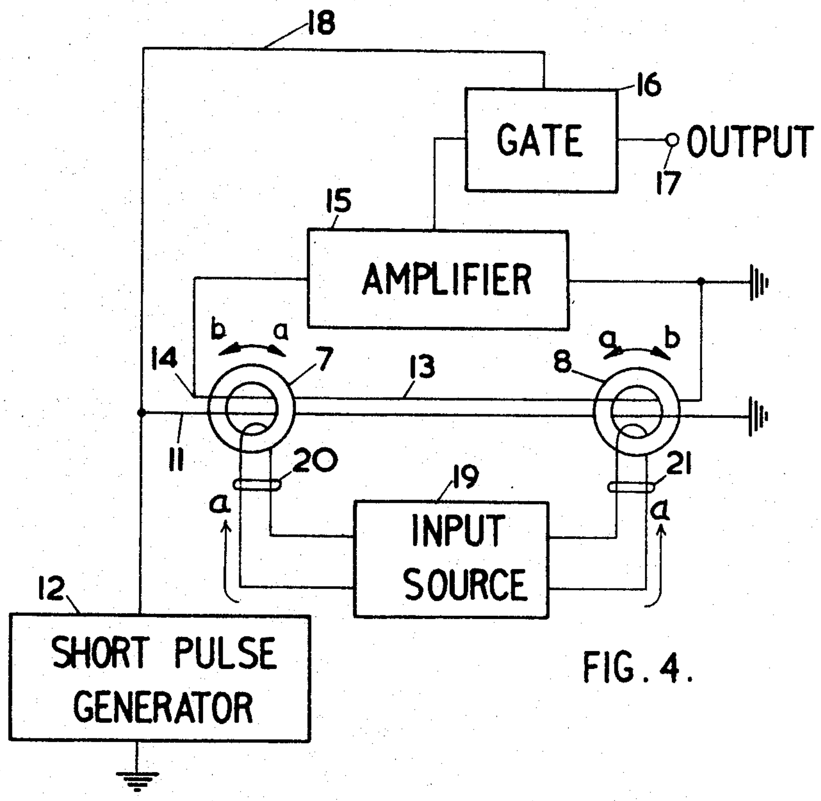
Figure 5:
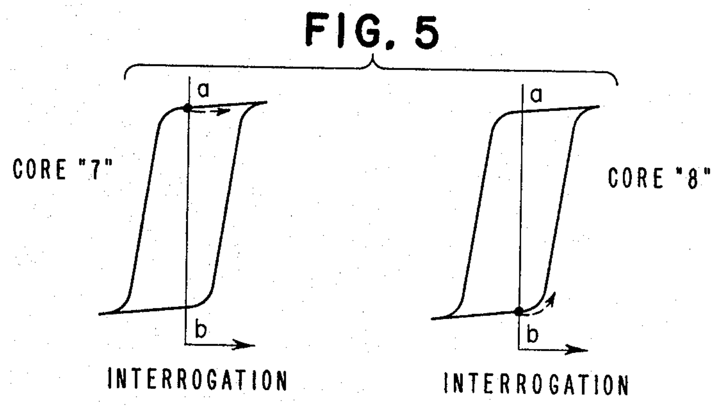
Figure 9:
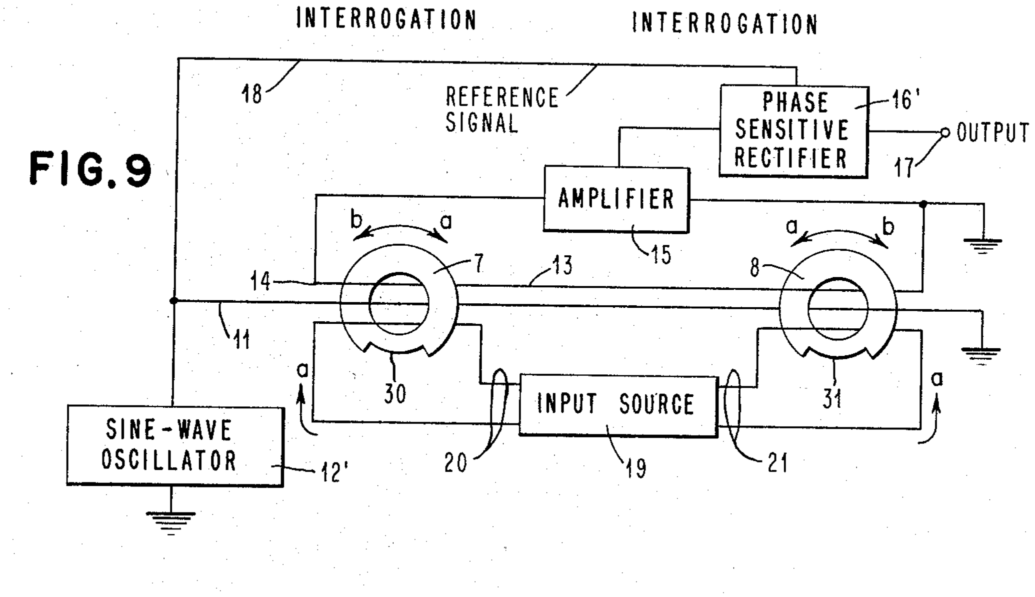
Figure 10:
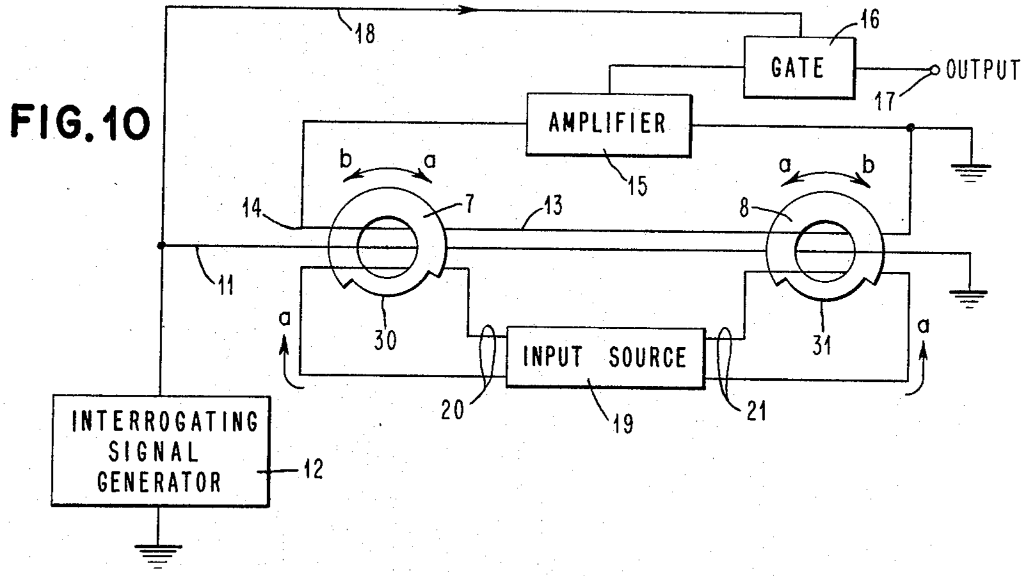
Figure 6:
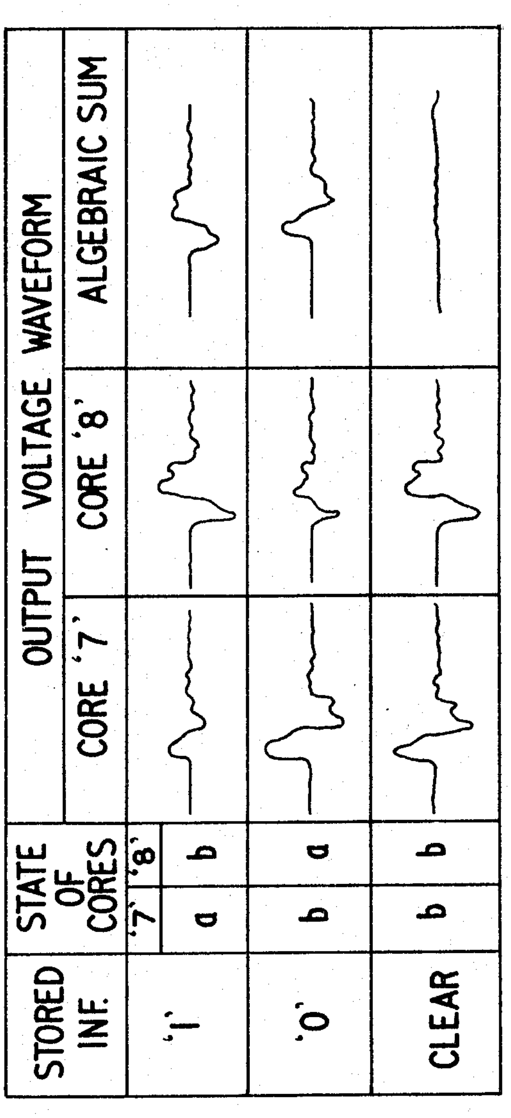
Figure 7:
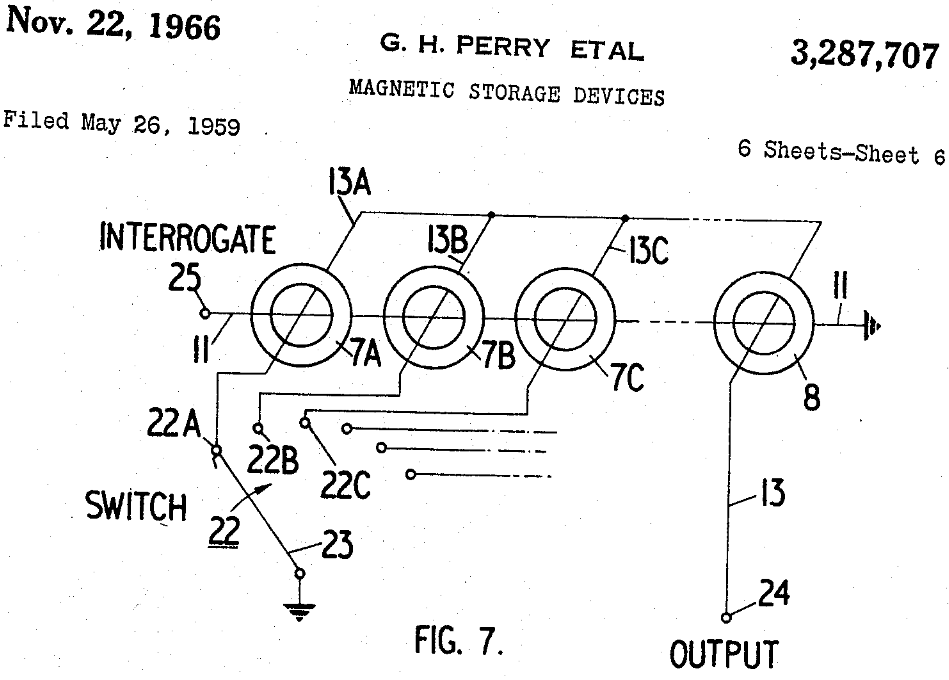
Figure 8:
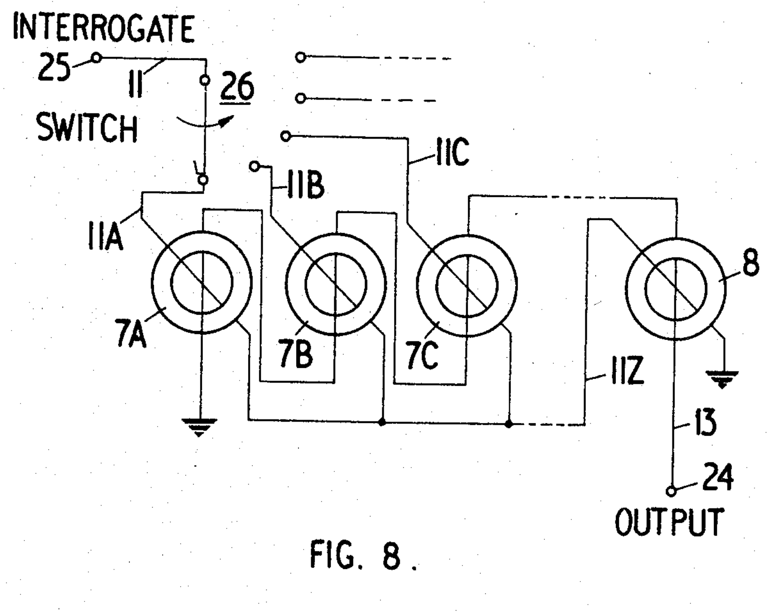

In the drawings:

FIG. 1 shows diagrammatically the circuit of a magnetic storage device utilizing a pair of rectangular hysteresis loop magnetic cores, FIG. 2 shows a form of rectangular hysteresis loop on a B–H diagram to assist understanding of the operation of the device of FIG. 1, and FIG. 3 shows typical waveform diagrams obtained in operation of the circuit of FIG. 1, FIG. 4 shows diagrammatically the circuit of a magnetic storage device adapted for operation as a three-state circuit;

FIG. 5 shows hysteresis loops for a pair of typical cores used in the device of FIG. 4 to aid understanding of its operation, FIG. 6 shows typical waveform diagrams for the circuit of FIG. 4, FIGS. 7 and 8 show the relevant parts of two different arrangements of groups of storage devices utilizing common circuits, FIG. 9 shows diagrammatically the circuit of FIG. 4 adapted to operate with A.C. interrogation signals, and FIG. 10 shows diagrammatically a generalized preferred form of the circuits of FIGS. 4 and 9.

In FIG. 2 a typical rectangular hysteresis loop for a core is drawn on a B–H diagram. The directions of the arrows designated *a* and *b* indicate the directions of increasing saturation in the *a* and *b* saturation states respectively. If a magnetising force is applied to the core, that is if H is increased, operating points 2 for the *a* state, 3 for the *b* state will travel either in the direction of the appropriate arrow or in the opposite direction accordingly as the saturation of the core tends to increase or the core tends to be driven away from saturation.

If the core is in the *b* state and the magnetising force is in the form of a short pulse which tends to increase the saturation the operating point will proceed along to, say, the point 4, and, after the pulse has ceased, will return to the point 3 due to the magnetic inertia effect. On the other hand, if the magnetising force is such as to drive the core away from saturation, the operating point will move from the point 3 towards the knee 5 and some way beyond it according to the magnitude of the force say to the point 6. After the pulse has ceased, the operating point will return to the point 3.

Thus due to this effect, a short duration pulse causes excursions along the saturation line and even around the knee region of the hysteresis loop without changing the magnetization state of the core. Similar operation is possible in the *a* state.

When the operating point is driven along the saturation line from the point 3 towards the point 4 a signal is induced in an output winding coupled with the core; and moreover, when the operating point is driven round the knee 5, to the point 6 and afterwards returns to the point 3, a relatively larger signal is induced in such an output winding. By displaying the signals on a high speed oscilloscope it is possible to obtain a clear indication that the induced signals in the output windings are different and so to know the state of a core from such signals but it is very difficult to distinguish in practice between these two signals which are of the same polarity and of similar maximum amplitude. The circuit to be described overcomes this difficulty to a great extent.

In the storage device of FIG. 1 therefore two magnetic cores 7 and 8 of rectangular hysteresis loop material are provided. A setting-up circuit consists of a wire 9 threaded through the core 7 and the core 8 and fed from a pulse generator 10; the generator 10 can be a simple pulse generating circuit or can be any convenient source of pulses for setting up the cores 7 and 8 in a desired arrangement of magnetic states so as to store a given bit of information.

It is convenient to adopt a convention for the magnetisation of the cores 7 and 8 and the cores 7 and 8 will be taken to be magnetised in the *a* and *b* states with the fluxes in the directions of the arrows as shown.

An interrogating circuit consisting of a wire 11 threaded through the core 7 in the same sense as the wire 9 and through the core 8 in the opposite sense to that of the wire 9 is connected to earth at one end and at the other to an earthed source 12 of short-duration interrogating pulses. An output circuit consisting of a further wire 13 earthed at one end is threaded in the same sense as the wire 9 through both the core 7 and through the core 8. The unearthed end 14 of the wire 13 is connected to an amplifier 15 which feeds through a gate 16 to an output terminal 17. The gate 16 is controlled by the output of the short-pulse generator 12 by virtue of a connection 18.

To consider the operation of the circuit of FIG. 1 it is first assumed that the pulse generator 10 has set-up the cores 7 and 8 into *b* states. For convenience of notation the state of the whole magnetic device is known as the "arrangement" of the individual states of the cores 7 and 8; and, of course, represents the information stored. In the present example the arrangement becomes an *aa* arrangement when say a 1 is being stored and thus a *bb* arrangement when a 0 is being stored. It could easily be an *ab*; *ba* or a *ba*; *ab* arrangement for example, provided the wires threading the cores were suitably sensed.

With the cores 7 and 8 in the *bb* arrangement a pulse from the short-pulse generator 12 drives the core 7 towards saturation and, by virtue of the threading of the wire 11 in the opposite sense through the core 8, the core 8 is driven away from saturation. That is, with reference to FIG. 2, the core 7 is driven from the working point 3 to the point 4 and the core 8 from the point 3 to the point 6. After the pulse has ceased both cores return to the working point 3.

During these excursions signals are induced in the wire 13, a larger signal being induced from the excursion in the core 8 than from the excursion in the core 7. Due to the relative senses of threading of the wire 13 through the cores 7 and 8 the two signals appear in it polarized in predetermined and opposing directions. These signals are applied in series to the amplifier 15 the output of which is then their algebraic sum, a pulse whose polarity is determined by the signal induced from the core 8—this signal more than balances the signal due to the excursion in the core 7. This signal occurs during the time of the short pulse from the short-pulse generator 12; it accordingly passes through the gate 16 which is then open, the generator 12 having passed a pulse over the connection 18 to the gate 16.

The result is that a signal, of polarity corresponding to that induced in the wire 13 by the driving of the core 8 from the working point 3 to the working point 6 and its subsequent return to the point 3, appears at the output terminal 17.

If it is assumed that the pulse generator 10 now drives the cores 7 and 8 into the *a* state then the subsequent appearance of a pulse from the short-pulse generator 12 in the wire 11 drives the core 7 away from saturation and the core 8 towards saturation; the cores are now in the *a* state and their working point corresponds to the point 2 in the hysteresis loop of FIG. 2.

The signal induced in the wire 13 due to this excursion in the core 7 will now be greater than the signal induced by the excursion in the core 8. Thus, when these induced signals are applied to the amplifier 15, an output signal will be obtained of a polarity determined by the induced signal due to the core 7 and an appropriately polarised signal will appear at the output terminal 17.

Briefly then, the signals induced into the wire 13 from the cores 7 and 8 are of opposite polarity—the energisation of the cores in every case being in the same sense—so that the output of the amplifier 15 is of the one polarity or the other depending on whichever core is driven away from saturation as far as the knee of the hysteresis loop; and this in turn depends upon the states of the cores 7 and 8 when the short pulse is applied to the wire 11. Hence the output at the output terminal 17 is a signal whose polarity indicates the state of the cores 7 and 8; and this output appears at each interrogation without any incidental change of state of the cores 7 and 8.

FIG. 3 shows typical waveforms which occur in the operation of the circuit of FIG. 1.

The curve $d(i)$ represents a single interrogating pulse output from the short-pulse generator 12 which is a current pulse energising the cores 7 and 8, in the $b$ state, by means of the wire 11. In the case of the core 7, the signal induced in the wires 13—it is being driven towards saturation—is shown in the curve $a(i)$ and the corresponding voltage induced in the wire 13 when the core 8 is driven away from saturation is shown in curve $b(i)$. The waveform of the signal (the algebraic sum of the curves $a(i)$ and $b(i)$) which is obtained at the output of the amplifier 15 is shown in the graph $c(i)$.

It will be seen that the area PA of the first spike of the curve $b(i)$ is significantly greater than the area NA of the first spike of the curve $a(i)$; the polarities of the two spikes are, moreover, in opposite senses. Thus the area of the first spike of the curve $c(i)$ which represents the difference (algebraic sum) of the areas PA and NA is of the same polarity as the area PA, conventionally positive.

For the case where the cores 7 and 8 are in the $a$ state the induced and difference signals are as shown in curves $a(ii)$, $b(ii)$ and $c(ii)$. The area NA′ (negative) of the first spike of the curve $a(ii)$ is greater than the area PA′ (positive) of the first spike of the curve $b(ii)$; consequently the difference area DA′ is in the negative sense as shown in $c(ii)$. Thus the output signals at the output of the amplifier 15 differ in polarity accordingly as the cores 7 and 8 are in the $b$ or the $a$ state.

In a typical circuit using Mullard D3 type-cores and arranged so that the wires 9, 11 and 13 are single turn circuits 100 millimicrosecond pulses having a 3 millimicrosecond rise time were fed from the pulse generator 12; the pulse amplitude was typically 450 milliamps. The amplitude of the pulses is of course chosen to suit the coercive force of the core material.

It will be appreciated that, in the foregoing, only the initial spikes of the different waveforms, $a(i)$, $b(i)$, $c(i)$; $a(ii)$, $b(ii)$, $c(ii)$, have been considered and the short-duration interrogation pulses, $d(i)$; $d(ii)$, are used to gate them out. It should be mentioned therefore that the second spikes, although of opposite polarity, are quite consistent with the first spikes and could, indeed, be employed for the purposes of the invention either together with the first spikes or on their own. This can be arranged by providing suitably timed interrogating and gating pulses.

Interesting phenomena have been observed in connection with the operation of the circuit of FIG. 1. If the interrogating pulse amplitude is changed by a ratio of two to one whilst ensuring satisfactory operation of the circuit the amplitude of the output pulses is changed in the ratio of three to one. More strikingly, if the interrogating pulse is a balanced pulse, a change of two to one in amplitude causes a change of five to one in the amplitude of the output pulses. These phenomena may have application in the construction of two co-ordinate matrices of storage devices.

The device, described above, operates as a two-state circuit. Operation as a three-state circuit will now be described with reference to FIG. 4 the interrogating and output circuits of which are designated similarly to the corresponding circuits of FIG. 1. The setting-up circuit, however is embodied in an input source 19 and energising wires 20 and 21 threaded through cores 7 and 8 respectively. The input source 19 comprises convenient means, for simplicity not described in detail here, by which the cores 7 and 8 of the circuit can be set-up into different arrangements of states to determine the information stored in the circuit. It will be appreciated that the input source 19 may be a simple arrangement of switching keys for controlling the energisation of the cores 7 and 8, or may be part of a digital computer for which the circuit of FIG. 4 provides a single storage element.

To consider the operation of the circuit of FIG. 4 it is convenient as in the case of FIG. 1 to choose definite, but arbitrary, conventions with which to inter-relate the directions of magnetisation of the cores 7 and 8 and the sensing of the wires 11 and 13 which thread both cores 7 and 8 and form part of the interrogation and output circuits respectively. The cores 7 and 8 are each considered to be magnetised in an $a$ state when, as a result of an interrogation pulse from the pulse generator 12, a small positive voltage pulse appears in the wire 13 due to the core 7, and a small negative voltage pulse appears in the same wire 13 due to the core 8; the interrelation is then such that the interrogation pulse drives both the cores 7 and 8 further into saturation in the $a$ state. The directions of magnetisation for the cores 7 and 8 when in the $a$ state are shown in the drawings by appropriately designated arrow heads the directions for the $b$ state being the reverse of those for the $a$ state. To consider the operation of the circuit assume first that the input source 19 has applied energising pulses of appropriate directions to the wires 20 and 21 so that the cores 7 and 8 are in the $a$ and $b$ states respectively. The circuit is now taken to be storing the binary digit 1.

In these circumstances an interrogating pulse applied to the wire 11 from the pulse generator 12 momentarily drives the core 7 further into saturation; on the other hand the core 8 is driven round the knee of the hysteresis loop; this can be visualised more clearly by reference to FIG. 5 which shows the hysteresis loop characteristics for the cores 7 and 8. As a result of this interrogation a negative-going signal is induced in the wire 13 from the core 8 which is larger than the positive-going signal induced in the same wire from the core 7.

The output of the amplifier 15 represents the algebraic sum of the two induced signals and the output signal at the OUTPUT terminal 17 is accordingly a negative going signal—the gate 16 ensures, of course, that signals due to extraneous recovery voltages induced in the wire 13 after the end of the interrogation pulse are rejected.

If the circuit is now considered as storing the binary digit 0, the cores 7 and 8 are in the $b$ and $a$ states respectively and the effect of an interrogation pulse is that induced pulses appear in the wire 13. These pulses are of the same polarity as previously; the pulse due to the core 7 is now, however, of greater amplitude than that due to the core 8 and the algebraic sum, and hence the output signal is a positive-going signal.

The circuit can also be considered as storing neither the binary digit 1 nor the binary digit 0 but to be in a clear state; this is the situation when the cores 7 and 8 are both in the $a$ state or both in the $b$ state. If it is taken that both cores 7 and 8 are set-up into the $b$ state, for example, an interrogation pulse causes pulses of opposite polarity but equal amplitude to be induced into the wire 13 and there is consequently no output signal at the OUTPUT terminal 17.

Thus, in the storage circuit described, output signals of different polarities are obtained according to the information stores and magnetic states are not changed by interrogation. Moreover the circuit can be set-up in clear states in which interrogation results in no output signal appearing.

Detailed and complete waveforms are shown in FIG. 6; it will be appreciated that the first pulse only of each waveform has been considered in the preceding description, it being understood that the latter part of each waveform is rejected when the gate 16 (FIG. 4) closes, at the end of an interrogation pulse, under the control of the generator 12 over the connection 18.

A modified arrangement may be provided in which an additional wire from the input source 19 threads both cores 7 and 8, but each in the opposite sense, to provide a separate clear wire for establishing the circuit in the clear state.

Moreover the setting-up circuit may be arranged in several ways; for instance the input source 19 may be coupled to the cores 7 and 8 by a plurality of wires threading the cores wherein the magnetisation of a core is achieved by, say, half-amplitude currents in each of two wires threading the same core. Such an arrangement may be provided by a computer in which a two or three dimensional matrix of storage elements is built up of a great many storage devices of the kind described with reference to FIG. 4.

A stack of two-dimensional matrices may be used to provide a three-dimensional matrix; the three-dimensional matrix is used to store "words," i.e. sequences of binary digits, and each two-dimensional matrix of the stack stores digits of the same significance within the words. Thus the number of words which can be stored by the stack is equal to the number of storage devices in each two-dimensional matrix.

A convenient arrangement is one which enables cores always to be changed in the same direction when writing in: this gives advantage as regards speed of operation.

Typically, "clear" wires for the words are provided by so called word wires which thread the cores of corresponding storage devices in each two-dimensional matrix. So-called "digit" wires are provided each of which threads the cores of all storage devices in a different two-dimensional matrix; the threading of these wires is arranged so that, when a wire is energised with current flowing in one direction, one arrangement of core states tends to be set-up and with current flowing in the opposite direction the other arrangement of core states tends to be set-up.

In operation the writing-in of a word into the three-dimensional matrix is initiated by a standard operation of clearing the storage devices of the location chosen for the word; this is done by fully energising the appropriate word wire to drive all the cores to the *b* state for instance. The word wire and all the digit wires are then simultaneously energised; the word wire carrying a current equal to, but opposite in direction to that which established the clear states and the digit wires carrying half-amplitude currents (which by themselves would not be large enough to change the state of a core) whose directions are determined according to the digits (1 or 0) it is desired to set into the word.

The result is that, in each storage device, the energisations due to the word wire and the digit wire oppose in one core of the device and assist in the other core; accordingly one core is changed in state and the other core merely executes a limited excursion without suffering a change of state.

The states of the cores in the storage device have been described above as those resulting from full energisation in one direction or the other—in other words a large hysteresis loop is traversed—operation can be achieved, however, at lower energisation levels. One method is to arrange that the cores, in one of their states, have been fully driven, and not so fully driven in the other; thus what is virtually a reference level is provided by the fully driven state. The effect is to use a smaller and somewhat less closely defined hysteresis loop.

Another and similar method is to predetermine two distinct magnetic states by choosing spaced values of remanence, one near the value for full saturation the other a smaller value but relating to the same direction of magnetisation. The word wire of a store consisting of a three-dimension matrix of storage devices for instance is then arranged so that in operation it energises the cores corresponding to a value of remanence half-way between the two chosen values to select a word position; the half-current digit wires can then become effective in setting-up a word which it is required to write into the store. The appropriate digit wires are energised and add or subtract to the energisations of the cores by the word wire according to the direction of current flow in them so that each core is energised to one or other of the two chosen values of remanence.

The threading of the digit wires through the cores determines the arrangements of the magnetisation states of the cores which indicate whether a 1 or a 0 is stored and consequently the directions of the currents in the digit wires determine the information written into store by the word and digit wires in conjunction.

In a practical storage circuit a number of storage devices may be provided in a group and each device requires two magnetic circuits, generally ferrite ring cores. It has been realised however, that, as long as it is required to interrogate the devices one at a time, a considerable economy is possible. This may be achieved by using one magnetic circuit in each device and having one common one in place of the second magnetic circuits of the devices of the group.

Two examples will now be described showing the use of the common magnetic circuit in a group of storage devices. In FIG. 7 the cores 7 (indicated as 7A, 7B, 7C . . . ), corresponding to the similarly designated cores of FIGS. 1 and 4 form the basis of a group of devices together with one common core 8 corresponding to the core 8 of the FIGS. 1 and 4. A common interrogate wire 11 threads all cores 7A, B, C, and 8 in the same sense and is fed from an interrogate terminal 25.

An output wire 13 is connected from an OUTPUT terminal 24 and threads the core 8 in the same sense as the cores 7 are threaded by the wire 11 and thereafter branches into parallel paths 13A, 13B, 13C; these thread the respective cores 7A, 7B, 7C in the opposite sense to that in which the wire 13 has already threaded the core 8. The paths 13A, 13B, 13C are connected to the contacts 22A, 22B, 22C of a multi-contact switch 22 whose movable arm 23 is connected to earth. An input source (for simplicity not shown) is coupled to the cores 7 (A, B, C) and 8 by energising wires (also not shown) and serves to set the cores 7 and 8 according to the information to be stored.

In operation the core 8 is set up in a given magnetic state which serves as a reference state for the setting-up of each storage device of which each of the cores 7A, 7B, 7C comprises an individual element; each storage device is set-up by setting the appropriate one of the cores 7A, 7B, 7C. The state of each core 7 relative to the state of the core 8 will determine the information stored in its device and, on interrogation by energising the wire 11, the presence or absence of an output signal at the OUTPUT terminal 24 via the wire 13 indicates the information stored.

It will be appreciated that the present arrangement allows a big saving in the number of cores which need be provided in a given group of storage devices.

An alternative arrangement is possible, the relevant parts of which are shown in FIG. 8, in which the interrogate wire 11 is routed by means of a switch 26 into different parallel paths 11A, 11B, 11C . . . . Each of the paths 11A, 11B, 11C threads a different one of the cores 7A, 7B, 7C and thereafter joins into a common path 11Z for threading through the core 8. The output wire 13 is threaded through the cores 7A, 7B, 7C in the same sense relative to the threading of the parallel interrogate paths 11A, 11B, 11C through these cores and in the opposite sense through the core 8.

The sensing of the interrogate and output wires 11 and 13 is, it will be appreciated, identical in the two cases of the FIGS. 7 and 8 and conforms with that of the examples of FIGS. 1 and 4.

In operation then the arrangement of FIG. 8 follows that of FIG. 7 with a minor difference because the interrogate wire 11 is routed via a switch 26 to the different cores 7; in FIG. 7, as described above, the output wire 13 is routed via the switch 22.

Although the switches 22 and 26 are shown as mechanically operated switches of the multiple contact type it is to be understood that switches of other types are possible and may be used; for instance a transistor switching circuit would be suitable.

To provide enhanced speed of operation of the storage devices, all of the magnetic circuits shown in FIGS. 1, 4, 7 and 8, are preferably of the type having a constricted cross-section along part of its length. Conveniently they may take the form of a ring core having a constricted section along part of the ring as shown by constrictions 30 and 31 in FIGS. 9 and 10, a ring core having an eccentric centre hole, or a core formed by a hole made in a slab of magnetic material critically near the edge of the slab so as to provide effectively a constriction in the path of magnetic flux round the hole.

FIG. 9 shows a three-state circuit as in FIG. 4, adapted to operate with A.C. interrogation signals. The circuit of FIG. 9 yields corresponding results to those obtained in the circuits of FIG. 4. The only changes required are to replace the short-pulse generator 12 and gate 16 of FIG. 4, respectively, by a sine-wave oscillator 12′ and phase-sensitive rectifier 16′. The connection 18 then feeds a reference signal from oscillator 12′ to rectifier 16′. The sine-wave oscillator operates at a frequency comparable with the PRF of the short-pulse generator it replaces, typically 10 Mc./s., both being interrogating signal generators as indicated at 12 in FIG. 10.

Energisation of the cores 7 and 8 to the *a* and the *b* states is arranged so that small hysteresis loop operation is obtained, one of the states corresponding to full saturation of the core in one direction and the other of the states corresponding to an energisation less than half-way to full saturation in the opposite direction.

In operation under A.C. interrogation conditions, an alternating current signal appears at the output terminal 17 which, accordingly as it is in-phase or in antiphase, indicates the arrangement of states of the magnetic cores 7 and 8 and hence the binary information stored in the device.

We claim:

1. Intelligence storage device including two substantially identical ferromagnetic storage elements each capable of being set to either one of two remanent magnetic states, a read wire and an output wire each threading both of the elemens with one of the wires passing through the elements in the same direction magnetically and the other wire passing through the elements in opposite directions magnetically, and a source of pulses coupled to said read wire, said pulses having an amplitude such that both of said elements are made to traverse only the reversible portions of their hysteresis loops, in opposite directions, to that by virtue of the different slopes of said reversible portions, the resultant output pulses produced in the output wire are of an amplitude and polarity dependent on the instantaneous magnetic state of said elements, and said magnetic states remain unaffected by said read out pulses.

2. A device as claimed in claim 1 including a write wire threading both said elements in the same sense as the output wire.

3. A device as claimed in claim 2 in which the output wire passes in the same directions magnetically through the two elements and the read wire passes in opposite directions magnetically through the two elements.

4. A device as claimed in claim 2 in which the output wire passes in opposite directions magnetically through the two elements and the read wire passes in the same direction magnetically through the two elements.

5. A device as claimed in claim 2 in which the storage elements are individual toroidal cores of ferromagnetic material.

6. A device as claimed in claim 2 in which the storage elements are each formed by the material surrounding a hole in a plate or block of ferromagnetic material.

7. Intelligence storage equipment including a coordinate array of storage devices each as claimed in claim 1 arranged in rows and columns with individual read wires threading all the elements of the devices in each row and individual output wires threading all the elements of the devices in each column.

References Cited by the Examiner

UNITED STATES PATENTS

| | | | |
|---|---|---|---|
| 2,666,151 | 1/1954 | Rajchman et al. | 340—174 |
| 2,776,419 | 1/1957 | Rajchman et al. | 340—174 |
| 2,781,503 | 2/1957 | Saunders | 340—174 |
| 2,800,643 | 7/1957 | Mestre | 340—166 |
| 2,974,308 | 3/1961 | Van Tongerloo | 340—174 |

References Cited by the Applicant

UNITED STATES PATENTS

| | | |
|---|---|---|
| 2,909,673 | 10/1959 | Gunderson. |
| 2,933,720 | 4/1960 | Newhouse et al. |
| 3,003,139 | 10/1961 | Perkins. |
| 3,027,547 | 3/1962 | Froehlich. |
| 3,032,749 | 5/1962 | Newhouse. |
| 3,037,197 | 5/1962 | Lockart. |
| 3,042,905 | 7/1962 | Kosonocky. |
| 3,090,036 | 5/1963 | Kauffman. |
| 3,112,470 | 11/1963 | Barrett et al. |
| 3,115,619 | 12/1963 | Barrett et al. |

OTHER REFERENCES

A 0.7-Microsecond Ferrite Core Memory, published in IBM Journal of Research & Development, vol. 5, No. 3, Rhodes, Russell, Sakalay, Whalen, July, 1961.

University of Illinois, Digital Computer Laboratory, report No. 97 "A One-Word Model of a Word-Arrangement Memory" by R. W. McKay, Knuyu and C. Pottle dated May 28, 1957.

TERRELL W. FEARS, *Acting Primary Examiner.*

IRVING SRAGOW, E. R. REYNOLDS, *Examiners.*

H. D. VOLK, G. E. MEYERS, J. MOFFITT, L. M. DALGARN, *Assistant Examiners.*